United States Patent [19]

Kato

[11] 4,274,348
[45] Jun. 23, 1981

[54] MULTIPLE PATTERN SEWING MACHINE

[75] Inventor: Masataka Kato, Nagoya, Japan

[73] Assignee: Brother Kogyo Kabushiki Kaisha, Aichi, Japan

[21] Appl. No.: 94,880

[22] Filed: Nov. 16, 1979

[30] Foreign Application Priority Data

Feb. 10, 1979 [JP] Japan .................................. 54-14829

[51] Int. Cl.³ .......................... D05B 3/02; G08B 5/36
[52] U.S. Cl. ................................................ 112/158 E
[58] Field of Search .................. 112/158 E, 277, 275, 112/278, 121.11, 121.12; 340/679, 680

[56] References Cited

U.S. PATENT DOCUMENTS 3,991,692  11/1976  Papajewski et al. ................. 112/278
4,005,664  2/1977  Garron .............................. 112/158 E
4,075,961  2/1978  Harris ................................ 112/277

Primary Examiner—Peter P. Nerbun
Attorney, Agent, or Firm—Browdy and Neimark

[57] ABSTRACT

A multiple pattern sewing machine with a trouble warning device. The sewing machine is provided with a pattern displaying device for indicating a selected stitch pattern from among a plurality of stitch patterns. The trouble warning device comprises a trouble detector disposed where detection of a trouble is desired in the sewing machine and a device for interrupting the supply of the indication signal to the pattern displaying device, in response to the trouble detecting signal from the trouble detector. Disappearing of the stitch pattern indication per se warns an operator of trouble occurrence.

3 Claims, 3 Drawing Figures

MULTIPLE PATTERN SEWING MACHINE

BACKGROUND OF THE INVENTION

This invention relates to a multiple pattern sewing machine, particularly a sewing machine with a trouble warning device for giving a warning of trouble in the machine to the operator.

When some troubles or faults occur, in sewing machines, such as over heating of the drive motor, faulty generation of a needle position detecting signal, wire-breakage in the foot controller, etc., there is a likelihood of developing into more serious trouble, if the situation is left unnoticed by the machine operator. This may result in injury to the operator. It is therefore necessary as well as desirable that the operator be given a warning of the occurrence of a trouble as quickly as possible, so that he or she may take appropriate steps such as checking or repair.

It has been conventionally practiced that a trouble is noticed to the operator by lightening or sometimes by blinking a trouble warning lamp (alarm lamp). Disposition of such an exclusive warning lamp is likely to be accompanied by some disadvantages, such as increasing the number of component parts or requiring a difficult mounting of other operating or indicating devices which are positioned on the front surface of the machine frame which has limited space for this purpose.

Such a warning lamp must be positioned so as to be easily and most likely to be noticeable by the operator when it is lighted. It is not preferable on the other hand that such a rarely used member be disposed at the most conspicuous position of the machine from the standpoint of the general appearance thereof.

SUMMARY OF THE INVENTION

It is therefore a primary object of this invention to provide a multiple pattern sewing machine with a trouble warning device which is composed of as few component parts as possible, does not detract from the machine appearance, and is capable of reliably giving a warning of the occurrence of a trouble.

It is another object of this invention to provide a multiple pattern sewing machine with a trouble warning device which is constructed and functions to assure the operator will not overlook the indication of the occurrence of trouble.

As to this invented trouble warning device, a pattern indicator, which is disposed on the front of the machine for indicating a desired stitch pattern selected from predetermined plural stitch patterns, is skilfully utilized as a combined or double-purposed device, i.e., a device for indicating a selected stitch pattern and the occurrence of trouble as well.

The pattern indicator should be primarily disposed at the best noticeable position, on the front, of a machine for indicating the selected pattern when the operator has selected his or her desired pattern by manipulating an operational button. It is therefore constructed and arranged to constantly indicate any one selected pattern during the operation period of the machine; and the operator looks at the indicator out of habit of confirming the selection of the desired pattern.

Characteristic feature of this invention resides in that the indicator does not indicate any one of the plural stitch patterns when some trouble has taken place in the machine. Thereby, a warning of the occurrence of a trouble is given to the operator.

This invention is applicable to a multiple pattern sewing machine having stitch forming instrumentalities, manually operable means for selecting a desired stitch pattern from among a plurality of predetermined stitch patterns, pattern displaying means on the front side of the machine for indicating each of the stitch patterns, and supplying means responsive to the operation of the manually operable means for supplying an indication signal to the pattern displaying means so as to indicate the selected stitch pattern. Such a sewing machine should have detecting means for detecting occurrence of trouble in the machine and generating a trouble signal and interrupting means responsive to the trouble signal for interrupting the supply of the indication signal to the pattern displaying means, and the disappearance of all the stitch patterns per se functions as a warning for an operator of the occurrence of trouble.

The interrupting means preferably includes gate means disposed between the supplying means and the pattern displaying means for passing the indication signal toward the pattern displaying means, and the gate means is adapted to interrupt passage of the indication signal during the generating time of the trouble signal.

A preferable multiple pattern sewing machine of this invention comprises stitch forming instrumentalities, a manual switch for selecting a desired stitch pattern from among a plurality of predetermined stitch patterns, a plurality of light emitting diodes disposed correspondingly to the stitch patterns on the front side of the machine for indicating each of the stitch patterns, supplying means for circularly supplying indication signals of a constant frequency to the diodes during the closure of the manual switch and keeping on supplying an indication signal to the diode corresponding to the stitch pattern which is indicated while the manual switch is opened, the supplying means including a plurality of first output terminals and a second output terminal, one terminal of each of the diodes being individually connected with each of the first output terminals, the other terminals of the diodes being adapted to be connected in common with the second output terminal, a detector for detecting occurrence of trouble in the machine and generating a trouble detecting signal, and a gate circuit disposed between the second output terminal and a common connection part of the diodes for interrupting the supply of the indication signals to the diodes during the generating time of the trouble detecting signal.

As stated above, when the operator begins sewing operation, he or she confirms by watching the pattern indicator whether the selection of the desired stitch pattern has been completed. It is quite convenient and advantageous that the watch of the indicator naturally leads him or her to habitually ascertain whether a trouble is present or not. There can be no other more certain trouble warning device, because he or she can not actually ascertain whether the machine is in a prepared state to form a desired stitch pattern or not while the pattern indicator is not lighted.

In this way the overlooking by the operator of a trouble occurrence can be prevented, which naturally reduces the probability of a possible developing of the trouble into a more serious one or further an injurious one to the operator. What is important in this respect is that the effect can be realized economically and without detracting from the appearance of the machine.

DETAILED DESCRIPTION OF THE PREFERRED EMBODIMENT

Figure 1:
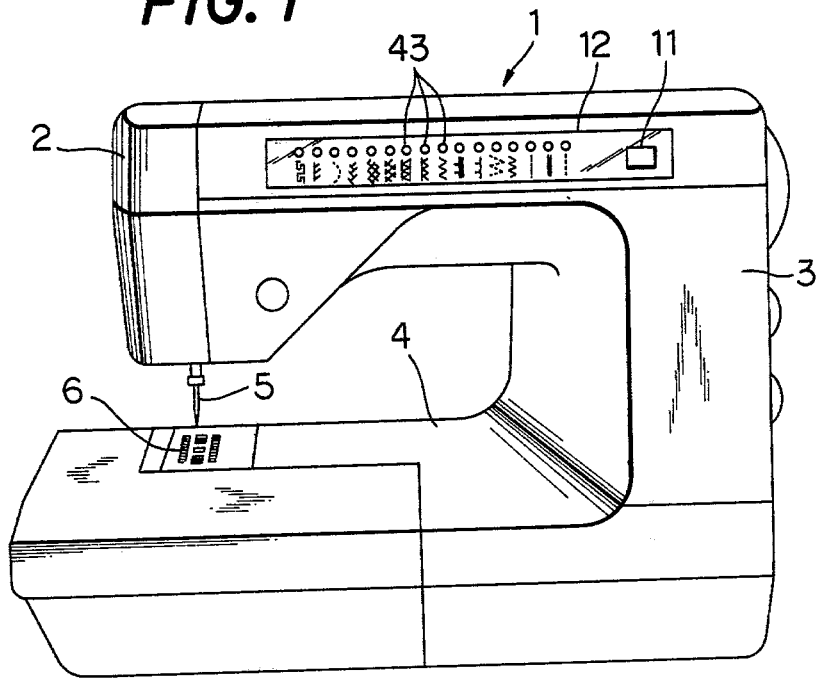
FIG. 1 is a perspective view of a multiple pattern sewing machine with a trouble warning device of this invention.

In a sewing machine in FIG. 1 in which this invention is preferably applied, a bracket arm 1 is provided on either end thereof with a head portion 2 and a standard 3, the lower end of the latter being carried by a bed 4.

On the front surface, facing the operator, are disposed a push button 11, which is a manually operated member for the operator to use when he or she wishes to select a desired stitch pattern from a plurality of predetermined patterns (16 kinds in this embodiment) and a display panel 12 on which indicia of the above-mentioned 16 patterns are displayed. Above each of the indicia a light emitting diode (LED) 43 is disposed.

Figure 2:
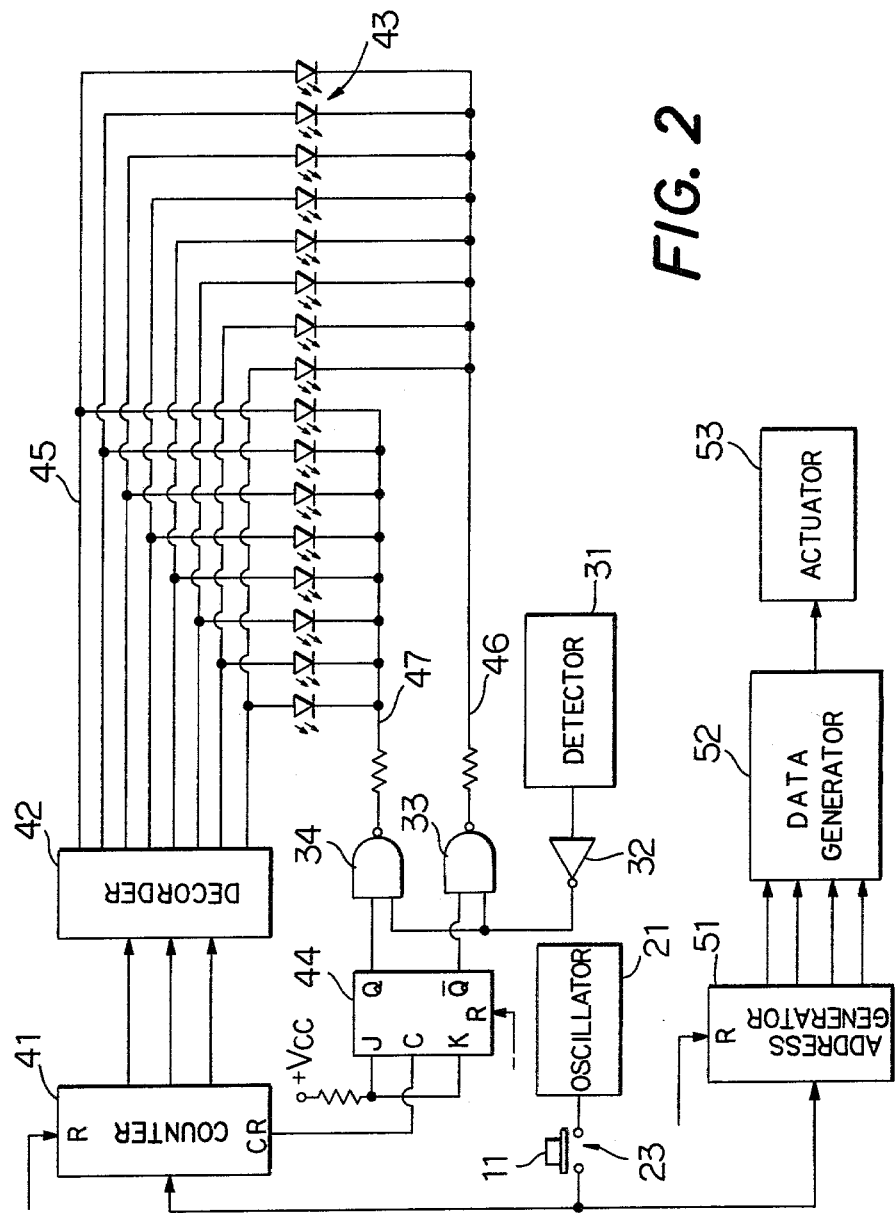
FIG. 2 is a block diagram showing an embodiment of the multiple pattern sewing machine.

The LED 43 is lighted (illuminated) by a circuit shown in FIG. 2. An oscillator 21 is for generating a pulse signal of specific frequency, which is connected, via a normal open switch 23 which is closed only while the push button 11 is depressed, to a counter (octal) 41 which counts in order, whenever a pulse signal input from the oscillator 21 rises, from "0" to "7" for outputting the significance as a digit of binary scale with three bits. Upon reaching "7" the counter 41 returns to "0" again. The counter 41 is connected to a decoder 42; the latter produces a signal of high level from only a specific terminal out of the eight output terminals based on the signal input from the counter 41. To each of the terminals of the decoder 42 are connected a pair of LEDs 43 out of the 16 LEDs corresponding to each stitch pattern on the display panel 12. That is to say, one out of a first group containing eight from the first to the eighth of the 16 LEDs 43, starting from right to left, and one out of a second group containing another eight from the ninth to the sixteenth are connected to the same terminal of the decoder 42, and the remainder in the two groups of the 16 LEDs are similarly connected, forming seven pairs respectively, to each same terminal of the decoder 42.

Figure 3:
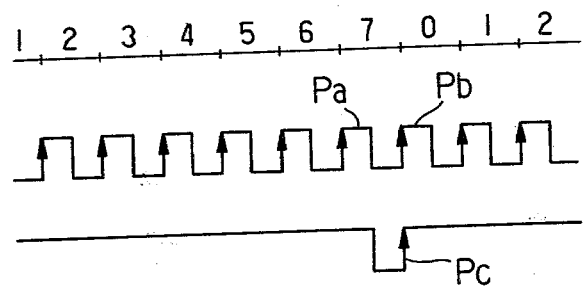
FIG. 3 is a timing diagram for explaining the operation mode of the embodiment.

The counter 41 is provided with a CR terminal which produces a carry signal Pc (see FIG. 3) which falls from high level to low level in response to the falling of a pulse signal Pa (see FIG. 3) for changing the significance to "7" and rises from low level to high level in response to the rising of a pulse signal Pb (see FIG. 3) for changing the significance from "7" to "0". The CR terminal is connected to a C terminal of a J-K flip-flop circuit 44. To a J terminal and a K terminal of this J-K flip-flop circuit 44 is respectively applied a high level voltage. To a $\overline{Q}$ terminal of the flip-flop circuit 44 the eight LEDs 43, from the first to the eighth, are connected through a lead wire 46 and a NAND circuit 33, and to a Q terminal of the same the other eight LEDs 43, from ninth to sixteenth, are connected through a lead wire 47 and a NAND circuit 34. The flip-flop circuit 44 is so built as to alternately change its holding state at every receiving of a rising of a carry signal output from the counter 41.

The oscillator 21 is connected, via a normal open switch 23, to an address generator 51, which memorizes starting (initial) addresses corresponding to various stitch patterns. Each starting address is sequentially selected in response to a pulse signal from the oscillator 21. The address generator 51 is connected to a data generator 52, which generates data required for forming stitches of each desired pattern. An actuator 53 for operating a mechanism regulating lateral oscillation of a sewing needle 5 (see FIG. 1) and another mechanism adjusting feed amount as well as feed direction of a feed dog 6 makes it possible to form a specific desired stitch pattern. A stitch forming system of this type is well known, being disclosed in, for example, U.S. Pat. No. 3,872,808 published on Mar. 25, 1975, which justifies omission of a further description. Besides, all of the counter 41, the flip-flop circuit 44, and the address generator 51 are reset, when electric power is supplied, by a signal input to each terminal R of them.

A detector 31 is disposed where detection of a trouble is desired, which is expected to generate a high level signal in case of a trouble occurring such as overheat of the drive motor, late producing or non-producing of a detection signal in a needle position detector for halting the needle at a desired position, or producing a excessive value of speed command for the drive motor due to a fault in a foot controller for controlling the drive motor. The detector 31 is connected, via a NOT circuit 32, to the NAND circuits 33 and 34.

The operation mode of the embodiment having the above-mentioned construction will be described next.

When electric power is supplied, the counter 41, the flip-flop circuit 44, and the address generator 51 are reset. Due to the resetting of the address generator 51, the data generator 52 is placed in a state wherein information (data) for forming a first stitch pattern (usually straight line stitch) is prepared to be generated, and the decoder 42 is placed in a state wherein a high level signal is output to the top lead wire 45 (see FIG. 2) and low level signals to the other lead wires. When the flip-flop circuit 44 is reset the Q terminal will be made low level and the $\overline{Q}$ terminal high level; unless the detector 31 outputs a high level signal because of there being no trouble in the machine, the output from the NOT circuit 32 will be high level and consequently the lead wire 46 will be low level and the lead wire 47 high level. Therefore the first (extreme right in FIG. 2) LED 43 is energized to be luminescent for indicating the first stitch pattern. If and when the operator wishes to change stitch patterns, he or she has only to depress the push button 11; then the normally open switch 23 is closed to consecutively input pulse signals from the oscillator 21 to the counter 41, and the luminescent LEDs 43 will be shifted leftwardly one by one at each pulse, with a result of sequentially changing the indicated stitch patterns. Due to the above-mentioned process the address generator 51 is changed, in the way of address selection, to place the data generator 52 in a state wherein information corresponding to the presently indicated stitch pattern can be generated. When the operator releases the depressing of the push button 11 upon noticing the indication of the desired stitch pattern the machine is consequently ready to form the same. The actuator 53 will act as predetermined according to the data produced from the data generator 52, and assures formation of the indicated stitch pattern on a work fabric.

The foregoing paragraph describes is the operation of a machine while no trouble is present. Once a trouble occurs the output from the detector 31 becomes high level, which is inverted in the NOT circuit 32 to be supplied to the input terminals of the NAND circuits 33 and 34 as a low level signal. The output terminals of the NAND circuits 33 and 34 consequently become high level, irrespective of the state of the Q and $\overline{Q}$ terminals of the flip-flop circuit 44. None of the LEDs 43 will be luminescent, even when any one of the output terminals of the decoder 42 generates a high level signal. The operator can not under this condition recognize from the LEDs which stitch pattern is now prepared to be formed, and it necessarily makes the operator notice there being something wrong in the machine.

As clearly understood from the above description, the manually operable means for the operator to select the desired stitch pattern is composed of the push button switch (11, 23), the indicating means for indicating the selected stitch patterns is composed of the LEDs 43 and the indicia designating the realizable stitch patterns, the indication signal supplying means is composed of the oscillator 21, the counter 41, the decoder 42, the flip-flop circuit 44, etc., and the restraining means for the indication signals is composed of the NAND circuits 33 and 34, in this embodiment. The above-mentioned means may be respectively substituted by other means as a matter of course, which is obvious to those skilled in the art. This invention should be interpreted to include all those substitutive means, although individual exemplification have been omitted.

What is claimed is:

1. In a multiple pattern sewing machine having stitch forming instrumentalities, manually operable means for selecting a desired stitch pattern from among a plurality of predetermined stitch patterns, pattern displaying means on the front of the machine for indicating each of said stitch patterns, and supplying means responsive to the operation of said manually operable means for supplying an indication signal to said pattern displaying means so as to indicate the selected stitch pattern, the improvement comprising:
   (a) detecting means for generating a trouble signal upon occurrence of trouble in the machine which prevents an appropriate sewing operation; and
   (b) interrupting means responsive to the trouble signal for interrupting feed of the indication signal to said pattern displaying means upon occurrence of trouble, whereby indication of all said stitch patterns disappears from said pattern displaying means thereby warning an operator of occurrence of the trouble.

2. The improvement according to claim 1, wherein said interrupting means includes gate means disposed between said supplying means and said pattern displaying means for passing said indication signal toward said pattern displaying means, and said gate means is adapted to interrupt passage of said indication signal during the generating time of said trouble detecting signal.

3. A multiple pattern sewing machine comprising:
   stitch forming instrumentalities;
   a manual switch for selecting a desired stitch pattern from among a plurality of predetermined stitch patterns;
   a plurality of light emitting diodes, each having a first terminal and a second terminal, disposed correspondingly to said stitch patterns on the front of the machine for indicating each of said stitch patterns;
   supplying means for sequentially supplying indication signals of constant frequency to said diodes during the closure of said manual switch and keeping on supplying an indication signal to the diode corresponding to the stitch pattern which is indicated while said manual switch is opened, said supplying means including a plurality of first output terminals and a second output terminal and said first terminal of each of said diodes being individually connected to a respective one of said first output terminals and said second terminals of each of said diodes being adapted to be connected in common with said second output terminal;
   a detector for generating a trouble signal upon occurrence of trouble in the machine which prevents an appropriate sewing operation; and
   a gate circuit disposed between said second output terminal and said second terminals of said diodes for interrupting the supply of said indication signals to said diodes during presence of said trouble signal; thereby warning an operator of the occurrence of the trouble.

* * * * *